United States Patent [19]
Starcevic

[11] 4,211,383
[45] Jul. 8, 1980

[54] ARRANGEMENT FOR SUPPORTING VERTICAL-AXIS MACHINE HOUSING

[75] Inventor: Mihailo Starcevic, Mellingen, Switzerland

[73] Assignee: BBC Brown Boveri & Company Limited, Baden, Switzerland

[21] Appl. No.: 789,885

[22] Filed: Apr. 22, 1977

[51] Int. Cl.² ............................................. F16M 13/00
[52] U.S. Cl. ........................................ 248/603; 248/1; 248/637
[58] Field of Search ..................................... 248/2, 26

[56] References Cited
U.S. PATENT DOCUMENTS

| | | | |
|---|---|---|---|
| 1,798,846 | 3/1931 | Kennedy | 248/26 |
| 1,991,339 | 2/1935 | Ullman | 248/26 X |
| 2,035,882 | 3/1936 | Hansson | 248/26 |
| 2,056,676 | 10/1936 | Kennedy | 248/26 |
| 2,936,141 | 5/1960 | Rapata | 248/26 |
| 3,601,343 | 8/1971 | Sivaslian | 248/2 |

FOREIGN PATENT DOCUMENTS

| | | |
|---|---|---|
| 164995 | 1/1950 | Austria . |
| 229959 | 3/1963 | Austria . |
| 1914702 | 4/1965 | Fed. Rep. of Germany . |
| 530109 | 12/1972 | Switzerland . |

Primary Examiner—William H. Schultz
Attorney, Agent, or Firm—Burns, Doane, Swecker & Mathis

[57] ABSTRACT

A support structure for a component of a vertical-axis machine such as its housing or a bearing spider thereof and particularly a rotary electrical machine which is expandable under operating conditions due to generation of heat. In order to maintain a stabilized concentric expansion of the component during thermal expansion the supporting structure is characterized by a system of plate springs arranged in substantially vertical planes and wherein the respective planes in which the springs are located lie tangent to the surface of at least one imaginary cylinder co-axial with the axis of the machine component, the radius of the cylinder being smaller than the mean radial distance of the plate springs from the axis of the machine component.

7 Claims, 5 Drawing Figures

4,211,383

ARRANGEMENT FOR SUPPORTING VERTICAL-AXIS MACHINE HOUSING

BACKGROUND OF THE INVENTION

The present invention relates to an improved arrangement for supporting the housing or bearing spider component of a rotary machine of the vertically arranged axis type such as an electrical machine, the component being expandable during operation, and being supported upon a foundation, or another component of the machine, by means of plate springs which are arranged in at least substantially vertical planes beneath the housing or bearing spider.

A vertical-axis machine housing, for example, which is at least approximately rotationally symmetrical about the machine axis expands during operation, the expansion being primarily due to changes in temperature. The housing should be free to expand concentrically with a minimum of inter-stresses between the housing and the foundation or other component on which it is supported. It has already been proposed to support the machine housing on the foundation either by bar springs under compressive stress as disclosed in Austrian Pat. No. OE-PS 164,995, or by means of radially arranged plate springs under compressive stress as disclosed in Austrian Pat. No. OE-PS 229,959, or by radially arranged plate springs under tensile stress, as disclosed in Swiss Pat. No. CH-PS 530,109. These structural solutions make possible a mechanical damping of an alternating torque and partially also an expansion of the machine housing, but such solutions will not ensure in a satisfactory manner maintenance of a complete, i.e., true circularity of the housing. This is especially so in the case of machines of large size. German Pat. No. DT-GM 1,914,702 describes and illustrates a different type of support structure in which the machine housing is secured to its support by means of springs which yield in the radial direction but are rigid in a tangential direction. However, this solution again meets only the requirement of free housing expansion, in this case the stator component of an electrical machine, but without ensuring maintenance of complete circularity of the stator during operation of the machine.

SUMMARY OF THE INVENTION

The present invention is concerned primarily with the problem of establishing an arrangement for supporting the housing or bearing spider component of a vertical-axis type machine which expands during operation, which will ensure not only complete freedom of thermally induced expansion but also maintenance of complete circularity. If the inventive concept is utilized for a rotary vertical-axis electrical machine, it is desired that the support also ensure satisfactory damping of forces generated by short-circuit conditions within the machine.

In accordance with the invention, these problems are solved by means of a plate spring type of support wherein the springs are located in at least substantially vertical planes and wherein the respective planes in which the springs are located lie tangent to the surface of an imaginary cylinder coaxial with the axis of the machine component, the radius of said cylinder being smaller than the mean radial distance of the plate springs from the axis of the machine component.

It is a particular advantage of the invention that the specific arrangement of the plate spring support makes possible a free thermal expansivity of the housing or bearing spider of a rotary vertical-axis electrical machine and ensures also a stabilized, true circularity of the component as well as damping for any short-circuit induced forces.

It is particularly advantageous to arrange the plate springs so that they are subjected to a compressive stress by the weight of the component being supported. This design is very simple from a standpoint of engineering design practice and fulfills its task in most instances. Another embodiment is possible wherein the plate springs are subjected to tensile stress by the weight of the machine component. This latter solution is particularly advantageous for single-phase electrical machines because the plate springs under tensile stress are able to deflect widely in case of a terminal short-circuit.

It is further advantageous to design the springs in the form of a multiple-plate structure. The thickness of the individual plates is selected in such manner that the maximum permissible bending stress of the material is not exceeded.

In accordance with one embodiment of the invention, the plate springs supporting the machine housing are arranged individually in a circle about the axis of the machine housing and upstand on the foundation. In another embodiment the plate springs are structurally associated with the arms of a load bearing spider, the spider being connected by the springs to the foundation or to the machine housing. The spider ensures proper centering and permits a relative expansion within the machine parts.

BRIEF DESCRIPTION OF THE DRAWINGS

The accompanying drawings illustrate four practical embodiments of the invention in somewhat schematic form.

With reference now to FIGS. 1 and 2, which illustrate in principle one embodiment of the invention, the housing 1 of the vertical-axis machine is seen to be supported upon a foundation 2 by means of a circular array of plate springs 3, 3' located respectively in vertical planes 5 and which are subjected to compressive stress by the weight of the housing. FIG. 1 shows only the three springs 3 located at the front portion of the housing. All of the springs are however included in FIG. 2. The vertical planes 5 are all seen to lie tangent to one and the same imaginary cylinder 4 located coaxially with the axis of the machine housing 1, the radius of said cylinder being smaller than the mean radial distance of the springs from the axis of the machine housing. The plate springs 3, 3' form acute angles with the radial direction. In the case where the expansion of the machine housing 1 is rotationally symmetrical, the radial forces acting upon the plate springs 3, 3' will divide into two components. The component acting within plane 5 will cause a practically insignificant deformation of the plate springs. The other component which is perpendicular to the plane 5 will, however, cause a relatively great movement of the plate springs. The radial expansion of the machine housing is thus converted to torsion, and a stability of its circular shape is ensured even in the case of an asymmetrical expansion or mechanical stress.

Figure 1:
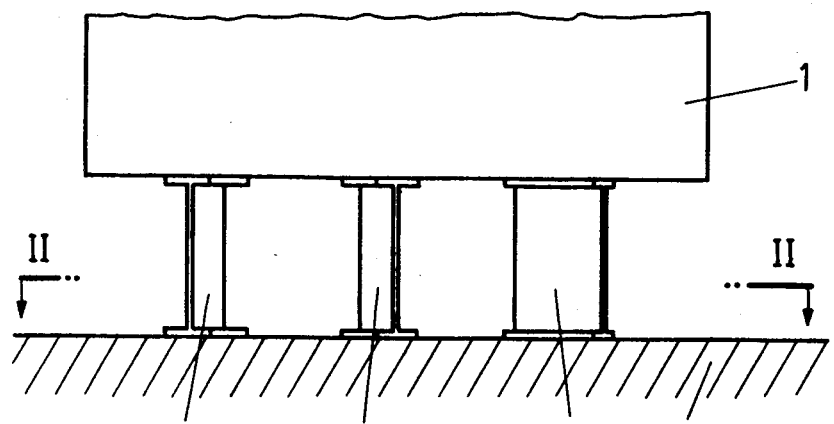
FIG. 1 is a front elevation of one embodiment of the invention wherein the machine housing is supported upon a foundation by means of a circular array of plate springs in vertical planes and subject to compressive stress by the weight of the housing.
Figure 2:
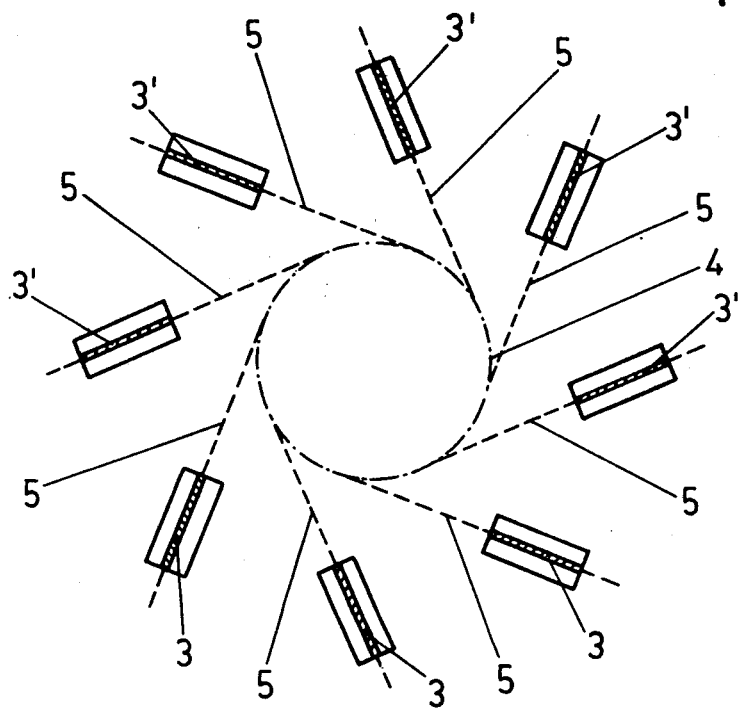
FIG. 2 is a transverse section taken on line II—II of FIG. 1.
Figure 3:
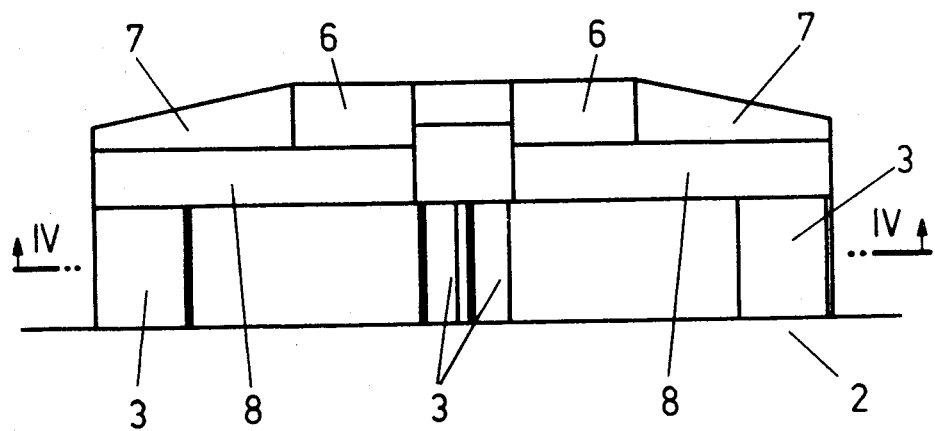
FIG. 3 is a view in elevation of another embodiment of the invention wherein the plate springs in vertical planes are structurally combined with the the arms of a support spider for securing the spider to a foundation.
Figure 4:
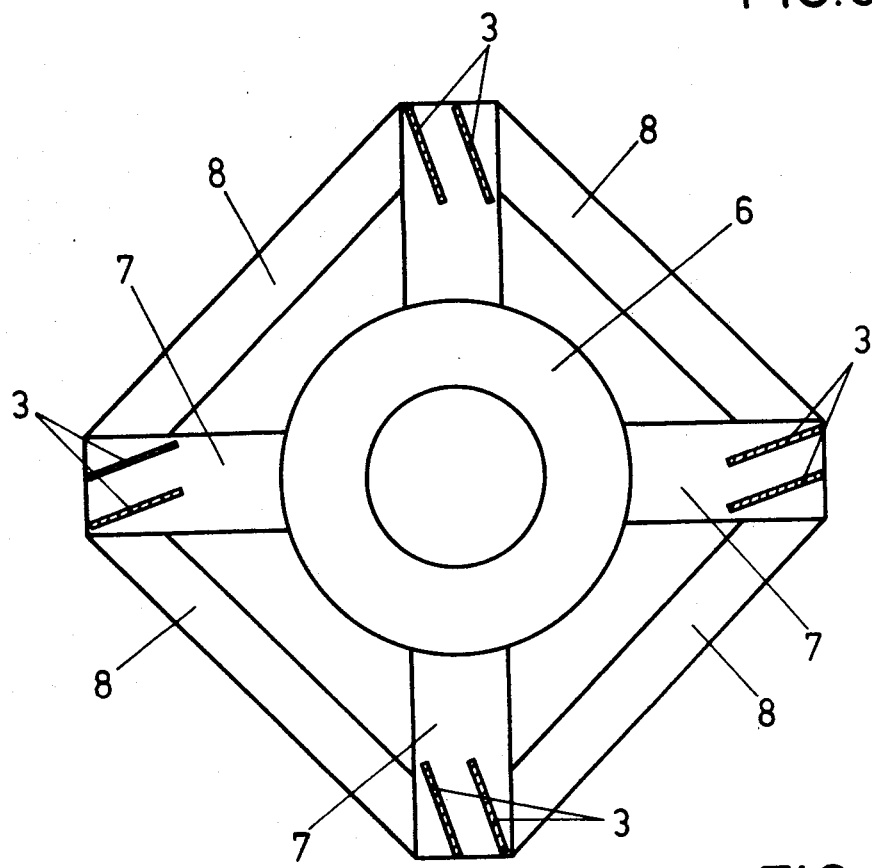
FIG. 4 is a transverse section taken on line IV—IV of FIG. 3.

Obviously, the plate springs 3, 3' need not be placed directly between the machine housing 1 and its foundation 2. In accordance with another embodiment illustrated in FIGS. 3 and 4, the plate springs 3 support a load-bearing spider structure consisting of a hub 6, four radially directed arms 7 extending at right angles from the hub, and beams 8 which interconnect the outer ends of the arms 7, at the foundation 2.

Figure 5:
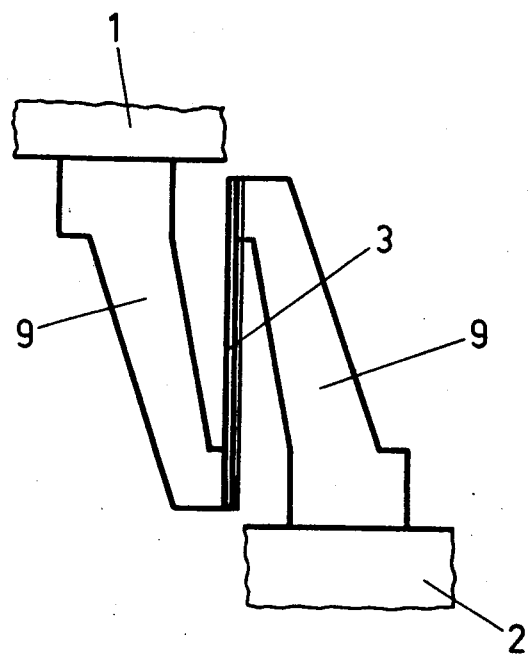
FIG. 5 is a view in elevation of still another embodiment of the invention wherein the plate springs in vertical planes are subjected to tensile stress by the weight of the machine housing.

FIG. 5 illustrates a third embodiment wherein the plate springs 3, only one such spring being shown however in order to simplify the drawing, are subjected to tensile stress, the upper end of the spring being secured to the upper end of an upstanding support member 9 on foundation 2, and the lower end of the spring being secured to the lower end of another support member 9 which depends from the housing 1. The spring structure in FIG. 5 also differs from that of FIGS. 1 to 4 in that it consists of a multiplicity of plates secured together such as by bolting, or welding or some other suitable means as distinguished from single-plate structures as illustrated in FIGS. 1 to 4.

In conclusion, the objective of the invention is not restricted to these four embodiments which have been specifically disclosed. It is also possible to apply the inventive concept in combination with other types of supporting components, e.g., inclined spokes which will still further improve centering of the machine component and ensure its circular stability under thermal expansion.

I claim:

1. In a support structure for a component of a vertical-axis machine which expands under operating conditions due to generation of heat, an improved support structure for maintaining a stabilized circularity of said component during thermal expansion, said improved support structure comprising:
    a plurality of plate springs arranged in substantially vertical planes, said plate springs each being individually secured between said component and a support member to support the component of the vertical axis machine, each of said plate springs being skewed relative to a radial projection both extending from the vertical axis of said machine and intersecting said plane in which each of said plate springs is arranged so that an acute angle between 0° and 90° is formed between the vertical plane in which each of the plate springs is arranged and the radial projection extending from the vertical axis of the machine.

2. In a support structure for a component of a vertical-axis machine which expands under operating conditions due to generation of heat, an improved support structure for maintaining a stabilized circularity of said component during thermal expansion, said improved support structure comprising:
    a plurality of plate springs arranged in substantially vertical planes, said plate springs supporting the component of the vertical axis machine, each of said plate springs being skewed relative to a radial projection both extending from the vertical axis of said machine and intersecting said plane in which each of said plate springs is arranged so that an acute angle between 0° and 90° is formed between the vertical plane in which each of the plate springs is arranged and the radial projection extending from the vertical axis of the machine, said vertical axis machine component being a bearing spider and said plate springs being located at outer ends of arms of said bearing spider.

3. A support structure as defined in claim 1 wherein said vertical-axis machine component is a bearing spider and said plate springs extend between said spider and the machine foundation.

4. A support structure for a component of a vertical-axis machine as defined in claim 1 wherein said plate springs are arranged in a circular array with the acute angle formed between the vertical plane and the radial projection being the same for each plate spring.

5. A support structure for a component of a vertical-axis machine which is expandable under operating conditions due to generation of heat, the support structure comprising:
    a plurality of generally planar plate springs, each plate spring having first and second ends, the first end of each plate spring being individually connected to said component and the second end of each plate spring being individually connected to a rigid support, each plate spring being arranged parallel to an axis of said component with the second end being axially disposed relative to the first end and with each of the plate springs being skewed relative to a radial projection both extending from the axis of the component and passing through the plane of each plate spring with an acute angle formed between the plane and the radial projection.

6. The support structure of claim 5 wherein the support is a foundation of the machine.

7. A support structure for a component of a vertical-axis machine which is expandable under operating conditions due to generation of heat, the support structure comprising:
    a plurality of generally planar plate springs, each plate spring having first and second ends, the first end of each plate spring being operatively connected to said component and the second end of each plate spring being operatively connected to a rigid support, each plate spring being arranged parallel to an axis of said component with the second end being axially disposed relative to the first end and with each of the plate springs being skewed relative to a radial projection both extending from the axis of the component and passing through the plane of each plate spring with an acute angle formed between the plane and the radial projection, said component being a bearing spider and the plate springs being located at outer ends of the arms of the bearing spider.

* * * * *